Nov. 5, 1946.  L. H. MANDERSTAM ET AL  2,410,670
APPARATUS FOR USE IN THE HYDROGENATION OF OILS
Filed March 19, 1943  3 Sheets—Sheet 1

Inventors,
Leopold H. Manderstam,
and
Lionel W. Warner,
Attorney.

Patented Nov. 5, 1946

2,410,670

UNITED STATES PATENT OFFICE 2,410,670

APPARATUS FOR USE IN THE HYDROGENATION OF OILS

Leopold Herman Manderstam and Lionel William Warner, London, England

Application March 19, 1943, Serial No. 479,810
In Great Britain March 20, 1942

9 Claims. (Cl. 23—288)

This invention relates to apparatus for use in the hydrogenation of oils such as vegetable, animal, animal-marine and fish oils.

The main object of the present invention is to provide hydrogenation apparatus by which a batch of oil can be treated uniformly. The oil which has been treated may be withdrawn and passed to a deodoriser after being filtered, without the necessity of first cooling the oil and whilst preventing access of air to the latter.

A further object of the present invention is the provision of a hydrogenation apparatus in which catalysts can be replaced conveniently after exhaustion by fresh or re-activated catalysts.

According to the present invention an apparatus for the hydrogenation of oils, such as vegetable, animal, animal-marine or fish oils, is provided with a hydrogenation chamber in which are mounted in parallel a number of tubes for the passage of the oil to be hydrogenated, each tube being adapted to receive a catalyst, the tubes being arranged substantially parallel to the longitudinal axis of the chamber, the chamber being provided with a cover having at least one closable opening therein for gaining access to the tubes for the removal and replacement of the catalyst.

The tubes are preferably mounted so as to be capable of being rotated about the longitudinal axis of the chamber in order to bring the tubes successively into register with the opening or openings provided eccentrically in the cover.

The tubes are preferably supported by a carrier rotatably mounted on an axial shaft and the lower ends of the tubes communicate with a rotary distributing chamber, at the lower end of the hydrogenation chamber, to which hydrogen and the oil to be treated are supplied.

Suitable means are provided for circulating the oil to be treated one or more times through the apparatus.

The invention will now be described with reference to the accompanying drawings, showing one example of construction of a hydrogenation chamber.

Figure 1:
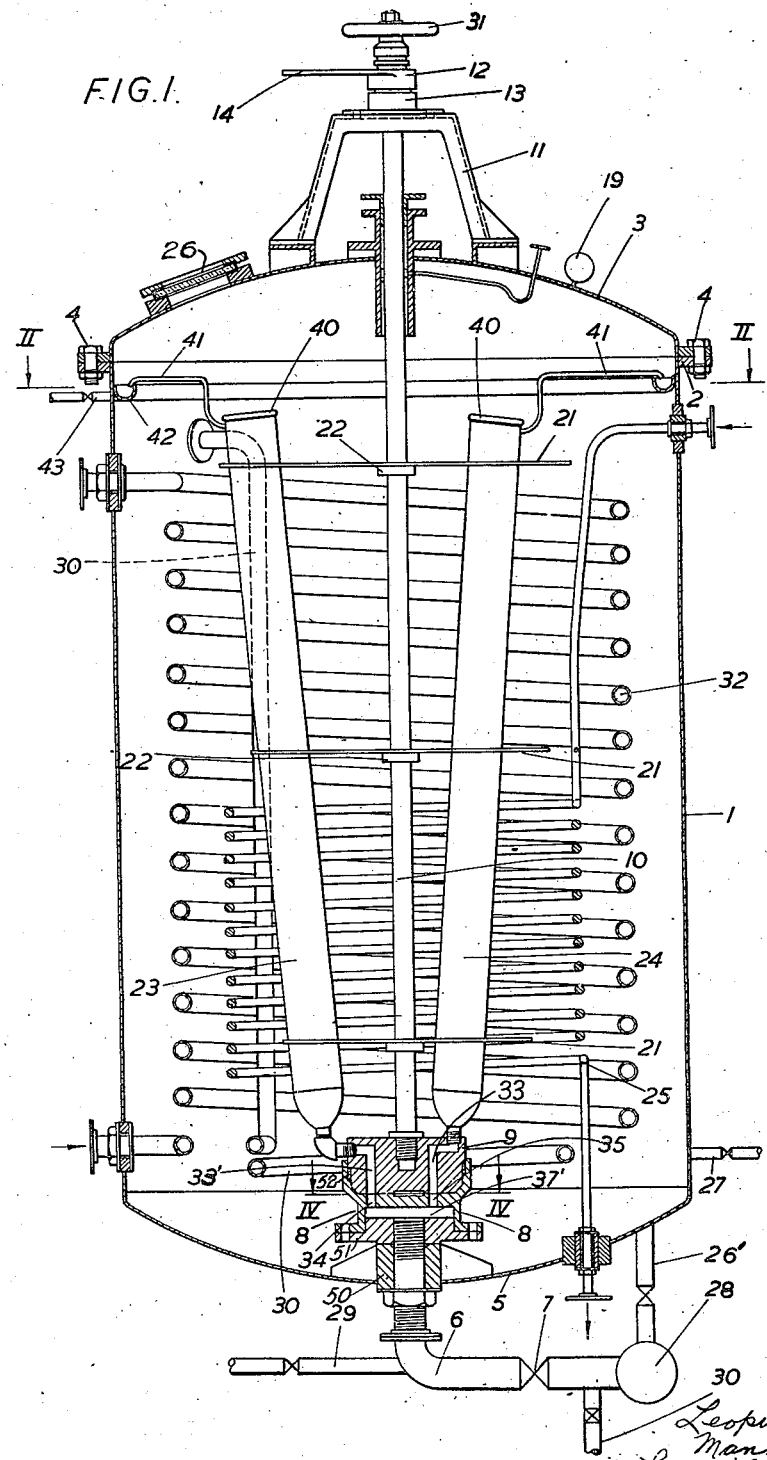
Fig. 1 shows a sectional elevation.
Figure 2:
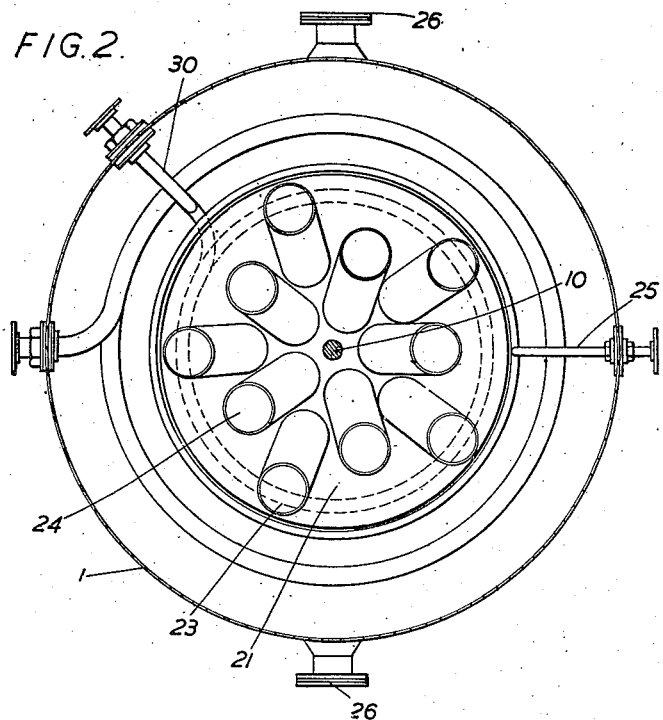
Fig. 2 shows a section on the line II—II of Fig. 1.
Figure 3:
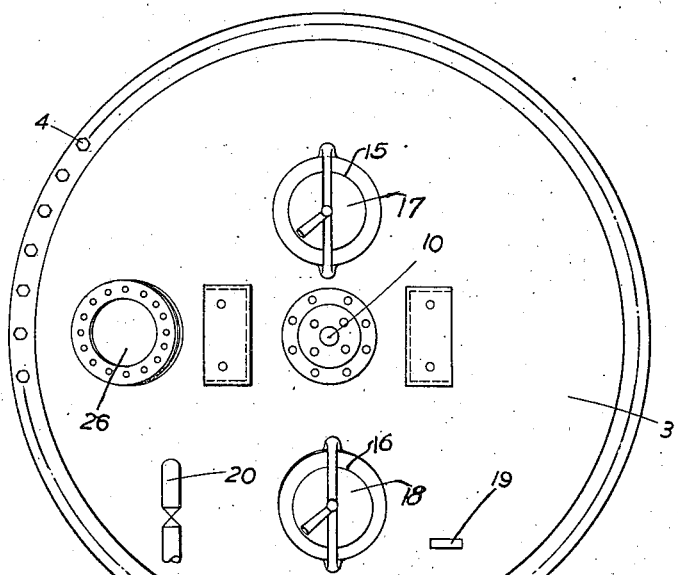
Fig. 3 is plan of Fig. 1 with the hand wheel and supporting bracket removed.

The apparatus, for the hydrogenation of oils, shown in the drawings, consists of a vertical cylindrical chamber 1 provided at its upper end with an outwardly extending flange 2 to which a cover 3 is suitably secured for example by bolts 4 and at its lower end the chamber 1 is closed by a bottom 5.

Through the bottom 5, preferably centrally, passes a supply pipe 6, controlled by a valve 7, for the admission of hydrogen under pressure and the oil to be treated, which is also supplied under pressure.

The supply pipe 6 leads through a boss 50, in the bottom 5, and a lower plate 51 secured to a chamber 8 of which the upper end is formed as a socket 52. In the socket 52 is mounted a valve body 9 secured to the lower end of a shaft 10 mounted axially of the hydrogenation chamber 1. The shaft 10 passes through the cover 3 and through a bracket 11 mounted on the cover 3. Near its upper end the shaft 10 is provided with a boss 12, freely rotatable thereon, having a cam surface for co-operating with a cam surface on a boss 13 mounted on the bracket 11. The arrangement of the cam surfaces on the bosses 12, 13 is such that in one position of the boss 12 relatively to the boss 13 the valve socket 9 is slightly raised, whilst in another position the valve socket 9 engages with its seat.

For this purpose of turning the boss 12 it is provided with an operating lever 14.

The cover 3 is provided with eccentrically positioned holes 15, 16 closed by covers 17, 18.

A pressure guage 19 is mounted on the cover 3 whilst the cover is also provided with a suitable valve-controlled vent 20 through which hydrogen can be allowed to escape from the hydrogenation chamber, preferably into a recovery apparatus for re-use, should it exceed a predetermined pressure.

On the shaft 10 is mounted a rotatable carrier 21 which is held in the required position on the shaft 10 by collars 22.

In the carrier are mounted two sets of uniformly spaced slightly inclined tubes 23, 24 of which the upper ends are spaced the same distance, from the central axis of the hydrogenation chamber 1 as the centres of the holes 15, 16 in the cover 3 from the centre of the latter.

The tubes 23, 24 are each adapted to receive any suitable solid metal catalyst such as nickel, nickel alloys or aluminum, arranged in any suitable manner and preferably contained in a removable container so that it can be withdrawn through the eccentric holes 15, 16 in the cover 3 in the manner hereinafter described; the lower ends of the tubes 23, 24 are connected to the valve socket 9.

The upper ends of the tubes 23, 24 are spaced a suitable distance from the cover 3 so as to allow oil passing out of the upper ends of the tubes 23, 24 to overflow into the hydrogenation chamber 1.

The hydrogenation chamber 1 is heated in any suitable manner by an internal heater, for example an electrical heater or a steam coil 25 preferably controlled by a thermostat.

A cooling coil 32 may also be provided if required.

The liquid level in the hydrogenation chamber 1 may be inspected through inspection glasses 26.

The hydrogenation chamber 1 may also be fitted with a thermometer.

In the bottom 5 are provided a valve-controlled outlet pipe 26' and a valve-controlled sampling tube 27.

A suitable pump 28 has its suction end connected to the outlet pipe 26' and its delivery end is connected to the supply pipe 6, in advance of the hydrogen inlet 29, for circulating oil one or more times through the apparatus above described until sufficiently hydrogenated.

When the oil has been sufficiently hydrogenated the delivery end of the pump is disconnected from the supply pipe 6 and discharges the treated oils from the apparatus through the pipe 30. The treated oil may be passed without cooling, to a deodoriser, preferably after being filtered.

For the purpose of treating oil the hydrogenating chamber 1 is first filled with oil which is heated to the required temperature by the heater 25. When the desired temperature is obtained the heating is continued, whilst the pump 28 circulates the oil through the chamber 8, the valve body 9, and the tubes 23, 24 containing the catalyst, whilst at the same time hydrogen is supplied to the supply pipe 6.

The pressure of the pump 28 is sufficient to force the oil up the tubes 23, 24 from which it overflows into the hydrogenation chamber 1.

The oil is circulated by the pump 28 until it has been sufficiently and uniformly treated, which is ascertained by withdrawing samples at intervals at 27.

Should it appear at any time that the catalyst in one or more of the tubes 23, 24 has been exhausted, then before treating the next batch of oil, the covers 17, 18 are removed, and the carrier 21 is rotated so as to bring the tubes 23, 24 successively into register with the eccentric openings 15, 16 so as to enable any desired catalyst to be withdrawn and replaced by fresh or re-activated catalysts.

When the exhausted catalysts have been replaced the covers 17, 18 are again fitted into the eccentric holes 15, 16 and the apparatus is ready for treating a fresh batch.

By means of the apparatus as above described a batch of oil can be hydrogenated substantially uniformly throughout.

The hydrogenation apparatus as above described has a minimum number of parts and consequently the sources of leakage are considerably reduced.

During treatment the oil may be agitated in any suitable manner. For example this agitation may be produced by placing into the hydrogenation chamber 1, around the tubes, one or more apertured coils 30 to which hydrogen under pressure is supplied.

The shaft 10 is provided at its upper end with a handwheel 31 for enabling it to be turned so as to bring the tubes into register with the openings 15, 16 in the cover 3 for enabling exhausted catalysts to be replaced.

With the arrangement as above described it is possible to circulate the oil through the tubes 23 or 24 or through both sets of tubes 23 and 24.

For this purpose the shaft 10 is turned into the required position by the handwheel 31. In order to enable this operation to be performed the lever 14 is operated to bring the cam surfaces of the bosses 12, 13 into such a position that the valve socket 9 is raised from its seating thus enabling the shaft 10 to be turned.

Figure 4:
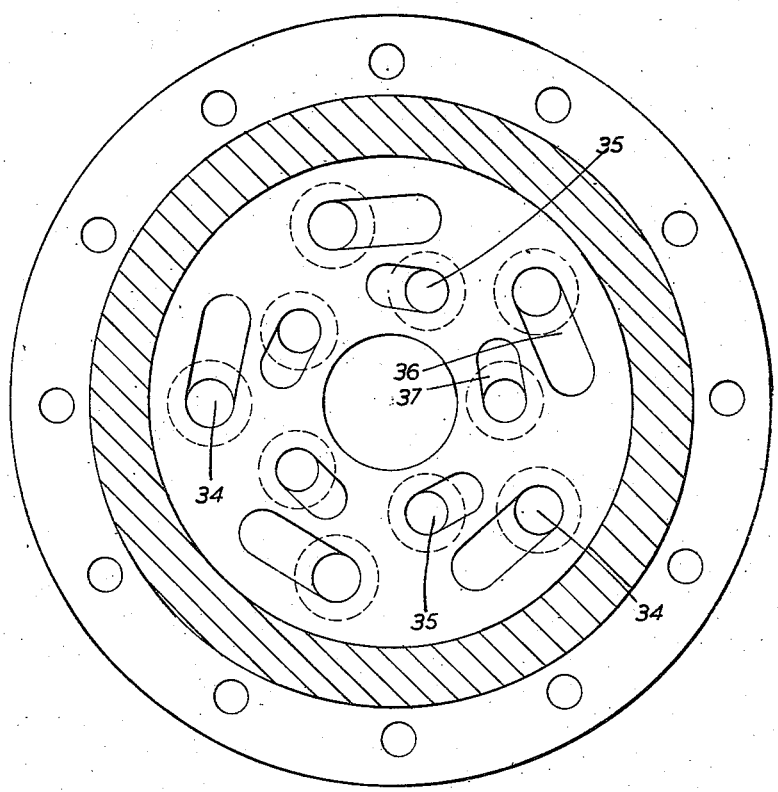
Fig. 4 is a section on the line IV—IV of Fig. 1.

The arrangement of the chamber 8 is shown in Figs. 1 and 4. The valve body 9 is provided with a plurality of passages 33', 33 with which the tubes 23, 24 communicate respectively. The passages 33', 33 are adapted to co-operate respectively with ducts 34, 35 in the chamber 8. The ducts 34, 35 preferably lead into grooves 36, 37 in the upper face of the chamber 8 so as to facilitate a clear passage for oil and hydrogen between the ducts 34, 35 and the passages 32, 33 even when these are not in complete register.

The ducts 34, 35 open into a space 37' in the distributing chamber 8 into which oil and hydrogen are supplied by the pipe 6.

The upper ends of the tubes 23, 24 may be closed in any suitable manner for example by plugs 40 and at a short distance below their closed upper ends the tubes 23, 24 are provided with outlet tubes 41 of which the outlet ends are located over a gutter or trough 42 arranged in the interior of the chamber 1. One or more preferable valve-controlled tapping points 43 may be provided in the trough or gutter 42.

We claim:

1. In an apparatus for the hydrogenation of oils, the combination with a vertical hydrogenation chamber having a bottom and a cover, of a plurality of tubes, removable containers for a catalyst, positioned one in each tube, said tubes being arranged in parallel inside said chamber and being arranged substantially parallel to the longitudinal axis of said chamber and having their upper ends spaced from said cover, said cover having a closable opening therein, said opening being positioned to permit access to said tubes for removal and replacement of the catalyst therein, means for supplying hydrogen and the oil to be treated to the lower ends of said tubes, a rotatable shaft mounted in said chamber along the longitudinal axis of the latter, said shaft carrying said tubes, and means for rotating said shaft, the arrangement being such that by rotating the said shaft the said tubes are brought successively into register with said closable opening.

2. In an apparatus for the hydrogenation of oils, the combination with a vertical hydrogenation chamber having a bottom and a cover, of a plurality of tubes, removable containers for a catalyst positioned one in each tube, said tubes being arranged in parallel inside said chamber and being arranged substantially parallel to the longitudinal axis of said chamber and having their upper ends spaced from said cover, said cover having a closable opening therein, said opening being positioned to permit access to said tubes for removal and replacement of the catalyst therein, means for supplying hydrogen and the oil to be treated to the lower ends of said tubes, a rotatable shaft mounted in said chamber along the longitudinal axis of the latter, said shaft carrying said tubes, said tubes being arranged in two sets, said sets of tubes being arranged concentrically around said shaft, one set being located at a shorter radius than the second set, said cover having a second closable opening therein, and means for rotating said shaft, said openings being so positioned that by rotating the shaft one set of tubes can be brought successively into register with one of said openings and the second set of tubes can be brought successively into register with the second opening.

3. In an apparatus for the hydrogenation of oils, the combination with a vertical hydrogenation chamber having a bottom and a cover, of a plurality of tubes, removable containers for a catalyst positioned one in each tube, said tubes being arranged in parallel inside said chamber and being arranged substantially parallel to the longitudinal axis of said chamber and having their upper ends spaced from said cover, said cover having a closable opening therein, said opening being positioned to permit access to said tubes for removal and replacement of the catalyst therein, a rotatable shaft mounted in said chamber along the longitudinal axis of the latter, said shaft carrying said tubes, said tubes being arranged in two sets, said sets of tubes being arranged concentrically around said shaft, one set being located at a shorter radius than the second set, said cover having a second closable opening therein, means for rotating said shaft, said openings being so positioned that by rotating the shaft one set of tubes can be brought successively into register with one of said openings and the second set of tubes can be brought successively into register with the second opening, a valve body mounted at the lower end of said shaft, the lower ends of said tubes being connected to said body, and a valve seat structure in the lower end of said first mentioned chamber, said valve seat structure having one face thereof shaped to form a socket in which said valve body is rotatably mounted and provided with a space below and partitioned from said socket, said valve body having a plurality of passages therein, one of said passages being associated with each tube, ducts through said partition in said valve seat structure leading from the space therein into said socket and arranged to coincide with said passages on movement of said valve body and means for supplying reactants to said space in said valve seat structure.

4. In an apparatus for the hydrogenation of oils, the combination with a vertical hydrogenation chamber having a bottom and a cover, of a plurality of tubes, removable containers for a catalyst positioned one in each tube, said tubes being arranged in parallel inside said chamber and being arranged substantially parallel to the longitudinal axis of said chamber and having their upper ends spaced from said cover, said cover having a closable opening therein, said opening being positioned to permit access to said tubes for removal and replacement of the catalyst therein, a rotatable shaft mounted in said chamber along the longitudinal axis of the latter, said shaft carrying said tubes, said tubes being arranged in two sets, said sets of tubes being arranged concentrically around said shaft, one set being located at a shorter radius than the second set, said cover having a second closable opening therein, means for rotating said shaft, said openings being so positioned that by rotating the shaft one set of tubes can be brought successively into register with one of said openings and the second set of tubes can be brought successively into register with the second opening, a valve body mounted at the lower end of said shaft, the lower ends of said tubes being connected to said body, and a second chamber in the lower end of said first mentioned chamber, said second chamber having one face thereof shaped to form a socket in which said valve body is rotatably mounted, said valve body having a plurality of passages therein, one of said passages being associated with each tube, said second chamber having a plurality of ducts in that face shaped to form a socket, said ducts being adapted to co-operate with said passages, said ducts and passages being so arranged that in one position of the valve body relatively to the second chamber, one set of tubes communicates with the ducts, in a second position of the valve body the second set of tubes communicates with the ducts, and in a third position of the valve body both sets of tubes communicate with the ducts, and means for supplying hydrogen and oil to said second chamber.

5. In an apparatus for the hydrogenation of oils, the combination with a vertical hydrogenation chamber having a bottom and a cover, of a plurality of tubes, removable containers for a catalyst positioned one in each tube, said tubes being arranged in parallel inside said chamber and being arranged substantially parallel to the longitudinal axis of said chamber and having their upper ends spaced from said cover, said cover having a closable opening therein, said opening being positioned to permit access to said tubes for removal and replacement of the catalyst therein, a rotatable shaft mounted in said chamber along the longitudinal axis of the latter, said shaft carrying said tubes, said tubes being arranged in two sets, said sets of tubes being arranged concentrically around said shaft, one set being located at a shorter radius than the second set, said cover having a second closable opening therein, means for rotating said shaft, said openings being so positioned that by roating the shaft one set of tubes can be brought successively into register with one of said openings and the second set of tubes can be brought successively into register with the second opening, a valve body mounted at the lower end of said shaft, the lower ends of said tubes being connected to said body, and a second chamber in the lower end of said first mentioned chamber, said second chamber having one face thereof shaped to form a socket in which said valve body is rotatably mounted, said valve body having a plurality of passages in that face shaped to form a socket, one of said passages being associated with each tube, said second chamber having a plurality of ducts therein, said ducts being adapted to co-operate with said passages, said second chamber having grooves therein, said grooves leading to said ducts and serving to provide a passage between said ducts and passages even when said ducts and passages are not in complete register, and means for supplying hydrogen and oil to said second chamber.

6. In an apparatus for the hydrogenation of oils, the combination with a vertical hydrogenation chamber having a bottom and a cover, of a plurality of tubes, removable containers for a catalyst positioned one in each tube, said tubes being arranged in parallel inside said chamber and being arranged substantially parallel to the longitudinal axis of said chamber and having their upper ends spaced from said cover, said cover having a closable opening therein, said opening being positioned to permit access to said tubes for removal and replacement of the catalyst therein, means for supplying hydrogen and the oil to be treated to the lower ends of said tubes, a rotatable shaft mounted in said chamber along the longitudinal axis of the latter, said shaft carrying said tubes, a plurality of plugs located one in the upper end of each tube, a gutter located inside the upper end of said chamber, a plurality of outlet tubes, one of said outlet tubes extending from the upper end of each of said first mentioned tubes and leading to said gutter, and means for rotating said shaft, the arrangement being such that by rotating the said shaft the said tubes are brought successively into register with said closable opening.

7. In an apparatus for the hydrogenation of oils, the combination with a vertical hydrogenation chamber having a bottom and a cover, of a plurality of tubes, removable containers for a catalyst positioned one in each tube, said tubes being arranged in parallel inside said chamber and being arranged substantially parallel to the longitudinal axis of said chamber and having their upper ends spaced from said cover, said cover having a closable opening therein, said opening being positioned to permit access to said tubes for removal and replacement of the catalyst therein, means for supplying hydrogen and the oil to be treated to the lower ends of said tubes, a rotatable shaft mounted in said chamber along the longitudinal axis of the latter, said shaft carrying said tubes, heat exchange means in said chamber, and means for rotating said shaft, the arrangement being such that by rotating the said shaft the said tubes are brought sucessively into register with said closable opening.

8. In an apparatus for the hydrogenation of oils, the combination with a vertical hydrogenation chamber having a bottom and a cover, of a plurality of tubes, removable containers for a catalyst positioned one in each tube, said tubes being arranged in parallel inside said chamber and being arranged substantially parallel to the longitudinal axis of said chamber and having their upper ends spaced from said cover, said cover having a closable opening therein, said opening being positioned to permit access to said tubes for removal and replacement of the catalyst therein, means for supplying hydrogen and the oil to be treated to the lower ends of said tubes, a rotatable shaft mounted in said chamber along the longitudinal axis of the latter, said shaft carrying said tubes, means for circulating the oil from the chamber through the tubes, and means for rotating said shaft, the arrangement being such that by rotating the said shaft the said tubes are brought successively into register with said closable opening.

9. In an apparatus for the hydrogenation of oils, the combination with a vertical hydrogenation chamber having a bottom and a cover, of a plurality of tubes, removable containers for a catalyst positioned one in each tube, said tubes being arranged in parallel inside said chamber and being arranged substantially parallel to the longitudinal axis of said chamber and having their upper ends spaced from said cover, said cover having a closable opening therein, said opening being positioned to permit access to said tubes for removal and replacement of the catalyst therein, a rotatable shaft mounted in said chamber along the longitudinal axis of the latter, said shaft carrying said tubes, said tubes being arranged in two sets, said sets of tubes being arranged concentrically around said shaft, one set being located at a shorter radius than the second set, said cover having a second closable opening therein, means for rotating said shaft, said openings being so positioned that by rotating the shaft one set of tubes can be brought successively into register with one of said openings and the second set of tubes can be brought successively into register with the second opening, a valve body mounted at the lower end of said shaft, the lower ends of said tubes being connected to said body, and a valve seat structure in the lower end of said first mentioned chamber, said valve seat structure having one face thereof shaped to form a socket in which said valve body is rotatably mounted and provided with a space below and partitioned from said socket, said valve body having a plurality of passages therein, one of said passages being associated with each tube, ducts through said partition in said valve seat structure leading from the space therein into said socket and arranged to coincide with said passages on movement of said valve body and means for supplying reactants to said space in said valve seat structure, the means for rotating the shaft comprising a hand wheel keyed to the shaft, and a fixed cam and a rotatable cam, said movable cam in one position relatively to the fixed cam raising said valve body in said socket and in a second position allowing said valve body to seat in said socket.

LEOPOLD HERMAN MANDERSTAM.
LIONEL WILLIAM WARNER.